US012440412B2

(12) United States Patent
Oei et al.

(10) Patent No.: US 12,440,412 B2
(45) Date of Patent: Oct. 14, 2025

(54) INCUBATION SYSTEM FOR LIQUID-BASED INCUBATION OF PREMATURELY BORN INFANTS

(71) Applicant: TECHNISCHE UNIVERSITEIT EINDHOVEN, Eindhoven (NL)

(72) Inventors: Swan Gie Oei, Eindhoven (NL); Franciscus Nicolaas Van De Vosse, Eindhoven (NL); Laurentius Michiel Gerardus Feijs, Eindhoven (NL); Marieke Beatrijs Van Der Hout-Van Der Jagt, Eindhoven (NL); Myrthe Van Der Ven, Eindhoven (NL); Franciscus Leonardus Marie Delbressine, Eindhoven (NL); Antoine Pascal Oei, Eindhoven (NL)

(73) Assignee: TECHNISCHE UNIVERSITEIT EINDHOVEN, Eindhoven (NL)

( * ) Notice: Subject to any disclaimer, the term of this patent is extended or adjusted under 35 U.S.C. 154(b) by 940 days.

(21) Appl. No.: 17/599,882

(22) PCT Filed: Mar. 30, 2020

(86) PCT No.: PCT/EP2020/059012
§ 371 (c)(1),
(2) Date: Sep. 29, 2021

(87) PCT Pub. No.: WO2020/201233
PCT Pub. Date: Oct. 8, 2020

(65) Prior Publication Data
US 2022/0192909 A1    Jun. 23, 2022

Related U.S. Application Data

(60) Provisional application No. 62/826,718, filed on Mar. 29, 2019.

(51) Int. Cl.
*A61G 11/00* (2006.01)
*A01N 1/143* (2025.01)

(52) U.S. Cl.
CPC .............. *A61G 11/00* (2013.01); *A01N 1/143* (2025.01); *A61M 2240/00* (2013.01)

(58) Field of Classification Search
CPC .................................................. A61M 2240/00
See application file for complete search history.

(56) References Cited

U.S. PATENT DOCUMENTS 2,723,660 A    11/1955   Greenberg
4,079,728 A *   3/1978   Gatts .................... A61G 11/00
                                                              5/655

(Continued)

FOREIGN PATENT DOCUMENTS

JP    2018527042 A    9/2018
RU       118863 U1    8/2012

(Continued)

OTHER PUBLICATIONS

International Search Report and Written Opinion mailed Jul. 23, 2020 for PCT/EP2020/059012.

(Continued)

*Primary Examiner* — Thaddeus B Cox
(74) *Attorney, Agent, or Firm* — Suiter Swantz IP

(57) ABSTRACT

The present invention relates to an incubation system for liquid-based incubation of prematurely born infants, comprising: —an inner chamber forming an amniotic basin comprising amniotic fluid, said basin being configured for holding said infant and being made from a flexible material configured for expanding said inner chamber volume in correspondence with the growth of said infant; —an outer chamber enclosing said inner chamber and comprising a temperature regulation fluid, —a fetal connection port, (Continued)

arranged for connecting with the umbilical cord of said infant, said umbilical cord providing a port in said inner chamber to said infant for providing dialyzation and nutrition compounds to said infant via said umbilical cord; —a fetal control unit, connected to said fetal connection port for control of said dialyzation and control of said provided nutrition by monitoring and controlling one or more of a pressure, flow and temperature thereof; an amniotic fluid circulation unit, arranged for connecting with an inlet/outlet port of said inner chamber and comprising a pump for circulating said amniotic fluid from said inner chamber and through a purification system located outside said inner chamber; and —a temperature regulation fluid control unit, arranged for connecting with an inlet/outlet port of said outer chamber and comprising a pump for circulating said temperature regulation fluid from said outer chamber and through a heat exchanger system located outside said inner chamber.

17 Claims, 5 Drawing Sheets

(56) References Cited

U.S. PATENT DOCUMENTS

| | | | | |
|---|---|---|---|---|
| 6,001,552 | A * | 12/1999 | Cooper | A61G 11/00 |
| | | | | 128/202.16 |
| 11,484,026 | B2 | 11/2022 | Tchirikov | |
| 2004/0193096 | A1 * | 9/2004 | Cooper | A61G 11/00 |
| | | | | 604/19 |
| 2007/0010005 | A1 * | 1/2007 | Sitzmann | A61M 1/36 |
| | | | | 435/283.1 |
| 2014/0221735 | A1 * | 8/2014 | Californiaa | C12M 21/06 |
| | | | | 600/34 |
| 2017/0128322 | A1 * | 5/2017 | Fassihi | A61P 3/02 |
| 2018/0168901 | A1 * | 6/2018 | Flake | A61G 11/00 |
| 2020/0323197 | A1 * | 10/2020 | Tchirikov | A01N 1/0247 |

FOREIGN PATENT DOCUMENTS

| | | |
|---|---|---|
| WO | 2016205622 A1 | 12/2016 |
| WO | 2018171905 A1 | 9/2018 |

OTHER PUBLICATIONS (2) Usuda MD, Maruo et al., "Successful maintenance of key physiological parameters in preterm lambs treated with ex vivo uterine environment therapy for a period of 1 week", Am J Obstet Gynecol. Oct. 2017;217(4):457.e1-457. e13, 13 pages.

Partridge, Emily A. et al., "An extra-uterine system to physiologically support the extreme premature lamb", Nat Commun. Apr. 25, 2017;8:15112, 15 pages.

Partridge, Emily A. et al., "An Extruaterine environment for neonatal development: Extending fetal physiology beyond the womb", Semin Fetal Neonatal Med. Dec. 2017;22(6):404-409.

European Patent Office, Office Action received in EP Application No. 20719336.8, Jul. 22, 2025, 4 pages.

* cited by examiner

INCUBATION SYSTEM FOR LIQUID-BASED INCUBATION OF PREMATURELY BORN INFANTS

TECHNICAL FIELD

The present invention relates to an incubation system for liquid-based incubation of prematurely born infants.

BACKGROUND

After birth, new-borns experience a transition from intra-uterine to extra-uterine life. This normally leads to physiological changes to the circulatory and respiratory systems. For extremely prematurely born infants, i.e. below the 28th week of gestation, their physiologic development is not ready to undergo these changes. The transition is then often complicated by a variety of sudden incidents, including cord clamping, heat loss from immature skin, the necessity of respiratory support, and delayed circulatory changes. Consequently, despite the promising outcome provided by advances in the use of neonatal intensive care units (NICU), still too many of extremely premature but viable infants will suffer permanent health complications.

Prior to birth, "fetal life support" is provided mainly through the placenta, a shared organ between mother and child. The placenta serves not only as lung and kidney, but also provides nutrition. Consequently, birth inevitably initiates the transition from fetal to neonatal physiology, regardless of fetal maturity. Hence the placental functions must be accounted for by either the infant or life-support systems such as mechanical ventilation and e.g. parenteral feeding. Although current intensive neonatal care is provided in a high-tech setting to mitigate the consequences of this transition as best as possible, current incubators remain a relatively hostile environment. Indeed, mechanical ventilation in premature infants accounts for a large portion of long-term morbidity. Hence, for preterm born infants the main problem is a too early transition to neonatal physiology.

The cardiorespiratory changes after birth are initiated by the first breath and by the clamping of the umbilical cord, i.e. the disconnection with the placental circulation. The latter can be delayed, but the very strong reflex to breathe after birth cannot be easily suppressed. Once the lung cavities have filled with air, the transition cannot be reversed, and the premature infant is dependent on life support.

For viable fetuses at risk of imminent preterm birth, these complications might be prevented by transferring them to an artificial womb, i.e. a similar environment as in-utero. The fetal cardiorespiratory physiology will be preserved in this liquid-based incubator, with the goal to delay and ease the transition to extra-uterine life.

Partridge et al. disclose in Semin Fetal Neonatal Med. 2017 December; 22(6):404-409 an extrauterine environment for neonatal development.

Usuda et al. disclose in Am J Obstet Gynecol. 2017 October; 217(4):457.e1-457.e13 an ex vivo uterine environment therapy platform to eliminate fetal infection and inflammation, while simultaneously extending the duration of hemodynamically stable ex vivo uterine environment therapy to 1 week.

Partridge et al. disclose in Nat Commun. 2017 Apr. 25; 8:15112 an extra-uterine system to physiologically support the extreme premature lamb.

The known extra-uterine systems are aimed mainly at the survival of the extreme premature infant, and not at providing a complete mimic of the womb environment.

SUMMARY

It is an object of the present invention to provide an improved incubation system for incubation of prematurely born infants, specifically a liquid-based incubation system.

It is a further object of the present invention to provide an improved incubation system for liquid-based incubation of prematurely born infants.

At least one of these objects is achieved by an incubation system for liquid-based incubation of prematurely born infants, comprising:
- an inner chamber forming an amniotic basin comprising amniotic fluid, said basin being configured for holding said infant and being made from a flexible material configured for expanding said inner chamber volume in correspondence with the growth of said infant;
- an outer chamber enclosing said inner chamber and comprising a temperature regulation fluid,
- a fetal connection port, arranged for connecting with the umbilical cord of said infant, said umbilical cord providing a port in said inner chamber to said infant for providing dialyzation and nutrition compounds to said infant via said umbilical cord;
- a fetal control unit, connected to said fetal connection port for control of said dialyzation and control of said provided nutrition by monitoring and controlling one or more of a pressure, flow and temperature thereof;
- an amniotic fluid circulation unit, arranged for connecting with an inlet/outlet port of said inner chamber and comprising a pump for circulating said amniotic fluid from said inner chamber and through a purification system located outside said inner chamber;
- a temperature regulation fluid control unit, arranged for connecting with an inlet/outlet port of said outer chamber and comprising a pump for circulating said temperature regulation fluid from said outer chamber and through a heat exchanger system located outside said inner chamber.

The incubation system according to the present invention serves as an artificial womb for prematurely born infants. It emphasizes the natural functions of the physiological womb.

List of Definitions

The following definitions are used in the present description and claims to define the stated subject matter. Other terms not cited below are meant to have the generally accepted meaning in the field.

"Fetal" or "fetal" as used in the present description means: Related to the fetus or infant to be incubated in the system according to the present invention. The infant is technically born at the moment of leaving the maternal uterus, but due to the incubation system according to the present invention it is not fully transitioning into extrauterine life. The infant remains in fetal stage, its physiological function and behaviour being identical to that in the womb. Therefore, the term fetal is also used in connection with the prematurely born infant for which the system according to the invention is developed.

"Infant" as used in the present description means: a recently born child, newborn or neonate, a baby. The term infant may also include a fetus. This term can refer to a human baby, but also the juveniles of other organisms. Preferably, the infant is a human baby.

"Preterm", "premature birth" or "prematurely born" as used in the present description relates to the birth of a baby before full development of the fetus. When the baby is a human baby, this generally means that a birth at fewer than 37 weeks' gestational age, as opposed to the usual about 40 weeks.

"Amniotic fluid" or "AF" as used in the present description means: the protective liquid contained by the amniotic sac. The fluid serves as a cushion for the growing fetus, but also serves to facilitate the exchange of nutrients, water, and biochemical products. In relation to the present invention, the fluid present in the inner chamber of the incubation system is also called amniotic fluid. This fluid can be an artificially made composition. The AF used in the incubation system of the invention may for instance comprise water, electrolytes, proteins, carbohydrates, lipids and phospholipids, and urea.

"Nutrition compounds" or "nutrients" as used in the present description means: compounds or substances that are used by the infant to survive and to grow and develop. These nutrients are supplied to the infant in the incubation system of the present invention via the umbilical cord and/or via the amniotic fluid.

"Extracorporeal membrane oxygenation" (ECMO) or "extracorporeal life support" (ECLS) as used in the present description means an extracorporeal technique of providing prolonged cardiac and respiratory support to persons by providing an adequate amount of gas exchange or perfusion to sustain life. In the present invention, the ECMO is not used to provide gas to the lungs, but oxygen may be provided via an oxygenator to the blood re-entering the umbilical circulation to the infant.

BRIEF DESCRIPTION OF DRAWINGS

The present invention is described hereinafter with reference to the accompanying drawings in which embodiments of the present invention are shown and in which like reference numbers indicate the same or similar elements.

DETAILED DESCRIPTION OF DRAWINGS

Figure 1:
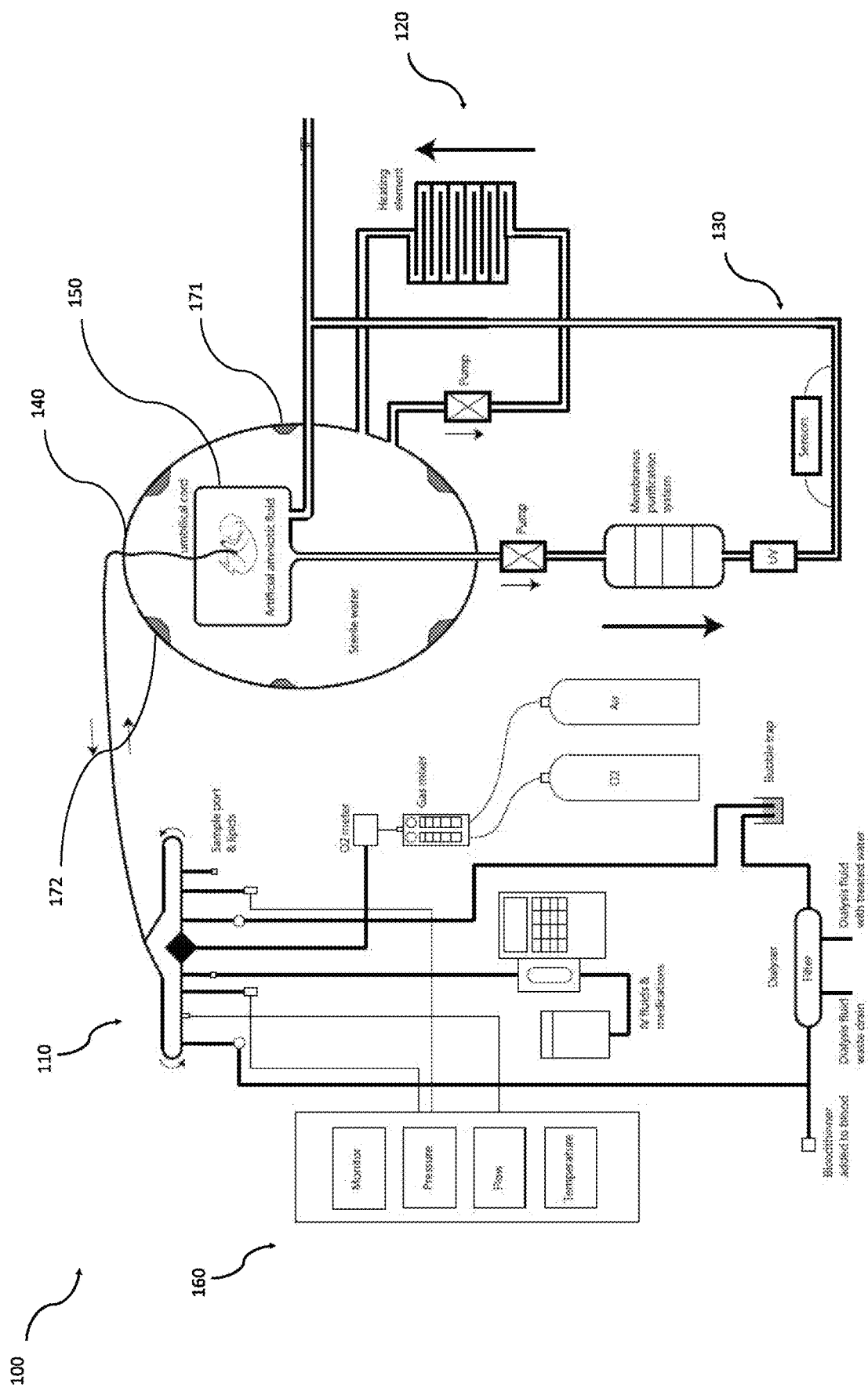
FIG. 1 schematically shows a first embodiment of the system according to the present invention, in use.

FIG. 1 shows an inner chamber 150, an outer chamber 140, a fetal connection port 110, a fetal control unit 160, an amniotic fluid circulation unit 130 and a temperature regulation fluid control unit 120.

The inner chamber 150 forms an amniotic basin comprising amniotic fluid. The basin is configured for holding an infant and being made from a flexible material configured for expanding the inner chamber volume in correspondence with the growth of the infant.

The inner chamber (artificial womb) stretches with infant growth, such that the infant has little perception of the differences between the real and artificial womb. A flexible material womb is designed to minimize the number of transfers of the infant on the one hand, and on the other hand to give a realistic tactile feedback to the infant, which is expected to be beneficial for normal limb/muscle development.

The outer chamber 140 encloses said inner chamber and comprising a temperature regulation fluid.

The temperature regulation fluid may comprise or consist of water.

The system comprises sensors 171, 172 inside or attached to the outer chamber. Sensors appear linked to the inner chamber. All sensors 171, 172 correspond to the function indicated next to the sensor. They may include microfluidic device and/or a capacitive sensors. Examples or sensors that can be present are a camera (360 degrees view), ultrasound imaging device, electrocardiograph (ECG), electroencephalograph (EEG), tactile sensor device to monitor e.g. breathing movements, chemical analysis device for blood and/or amniotic fluid to monitor nutrition, respiration and kidney function.

This tailored monitoring can be used to assess fetal growth and well-being, in order to fine-tune the life-support functions of the system on the one hand, and guide decision-making on the other hand.

The system may comprise one or more stimulation devices inside or attached to the outer chamber. These devices may include auditory stimulation devices, visual stimulation devices and tactile stimulation devices. The stimuli can be applied without the actual presence of the mother and other family members, through external applied movements on the system; audio speakers to play sounds, and controlled lighting to mimic the diurnal rhythm. This is a chamber-inside-chamber design: the inner chamber mimics the womb, the outer chamber is to apply the auditory, visual and tactile stimuli in a controlled environment (in the respective figures, see text associated with outer chamber). The outer chamber is equipped with temperature control (see heating element in respective figures), although primary temperature control will take place through the blood temperature regulation of the blood in the placental circulation. The inner chamber contains amniotic fluid that is constantly refreshed to prevent infection.

The inner chamber is a representation of the womb, while the outer chamber allows for local stimuli, measurement devices, etc. specific for this infant (this can be seen as a representation of the mother/maternal environment). As each infant has its own inner and outer chamber, stimuli can be individualized.

The temperature regulation fluid control unit 120 is arranged for connecting with an inlet/outlet port of the outer chamber and comprises a pump for circulating the temperature regulation fluid from the outer chamber and through a heat exchanger system located outside the inner chamber.

There is a heating element provided connected to the outer chamber, which serves to heat the temperature regulation fluid, which may be water, such that there is a constant body temperature of the outer chamber, and thereby of the inner chamber. It is safer to control the temperature of the outer than of the inner chamber.

There is a pump provided connected to the outer chamber, which serves to create a constant flow of water to be heated, and thus a constant temperature of the outer chamber.

The amniotic fluid circulation unit 130 is arranged for connecting with an inlet/outlet port of the inner chamber and comprising a pump for circulating said amniotic fluid from the inner chamber and through a purification system located outside the inner chamber.

There is a pump provided connected to the inner chamber, which serves to create a constant flow of amniotic fluid (AF) for refreshing and filtering.

There is a membrane purification system provided, which serves to clear the AF from any compounds that should not be present in AF.

The amniotic fluid circulation unit comprises a UV light source, as one or more sensors arranged for purification of the AF. The source of UV-lightserves to kill all potential bacteria present in AF. There are sensors provided which appear to be connected to the UV, which serve to check the level of purification and killing of bacteria.

The amniotic fluid circulation unit comprises an inlet port to introduce nutrients and water into the amniotic fluid.

The sensors next to the label 'supply for nutrients & water supply) monitor the nutrition level in the amniotic fluid.

The fetal connection port 110 is arranged for connecting with the umbilical cord of the infant. The umbilical cord provides a port in the inner chamber to the infant for providing dialyzation and nutrition compounds to the infant via the umbilical cord. The port may also be for providing oxygen and/or medication.

The umbilical cord connects the baby to the fetal circulation.

The fetal control unit is connected to the fetal connection port for control of said dialyzation and control of the provided nutrition by monitoring and controlling one or more of a pressure, flow and temperature thereof.

The fetal control unit comprises a placenta circulation block which relationship with the fetal circulation is similar as in real situation: only through the umbilical cord (intact physiological circulation).

The fetal control unit comprises an inlet port assembly for fluids, arranged for connecting with the umbilical cord of said infant. There are components for IV fluids and medications provided, linked to the artificial placenta circulation block, to deliver fluids and medications directly via the placenta side.

There are monitor, pressure, flow and temperature blocks provided, all linked to the artificial placenta circulation block. The monitor provides information on blood pressure, blood flow, and blood temperature of the placental circulation (i.e. maternal side). Pressure, flow and temperature involve both sensors connected to the blood in the umbilical cord or to the fetal control unit, and regulators in the fetal control unit.

The fetal control unit comprising an extra corporeal membrane oxygenation unit (ECMO). The provided $O_2$ meter is connected to the artificial placenta circulation block. The function of the $O_2$ meter is to measure oxygen level in the blood, in order to regulate oxygen supply within physiological range. The regulation is done with a gas mixer, connected to a tank with $O_2$ and a tank with air.

There is a dialysis unit provided connected to the placental circulation. There is a bloodthinner added to the blood, a filter for dialysis with a waste drain (left side) and inlet (right side) for treated water, and a bubble trap.

Figure 2:
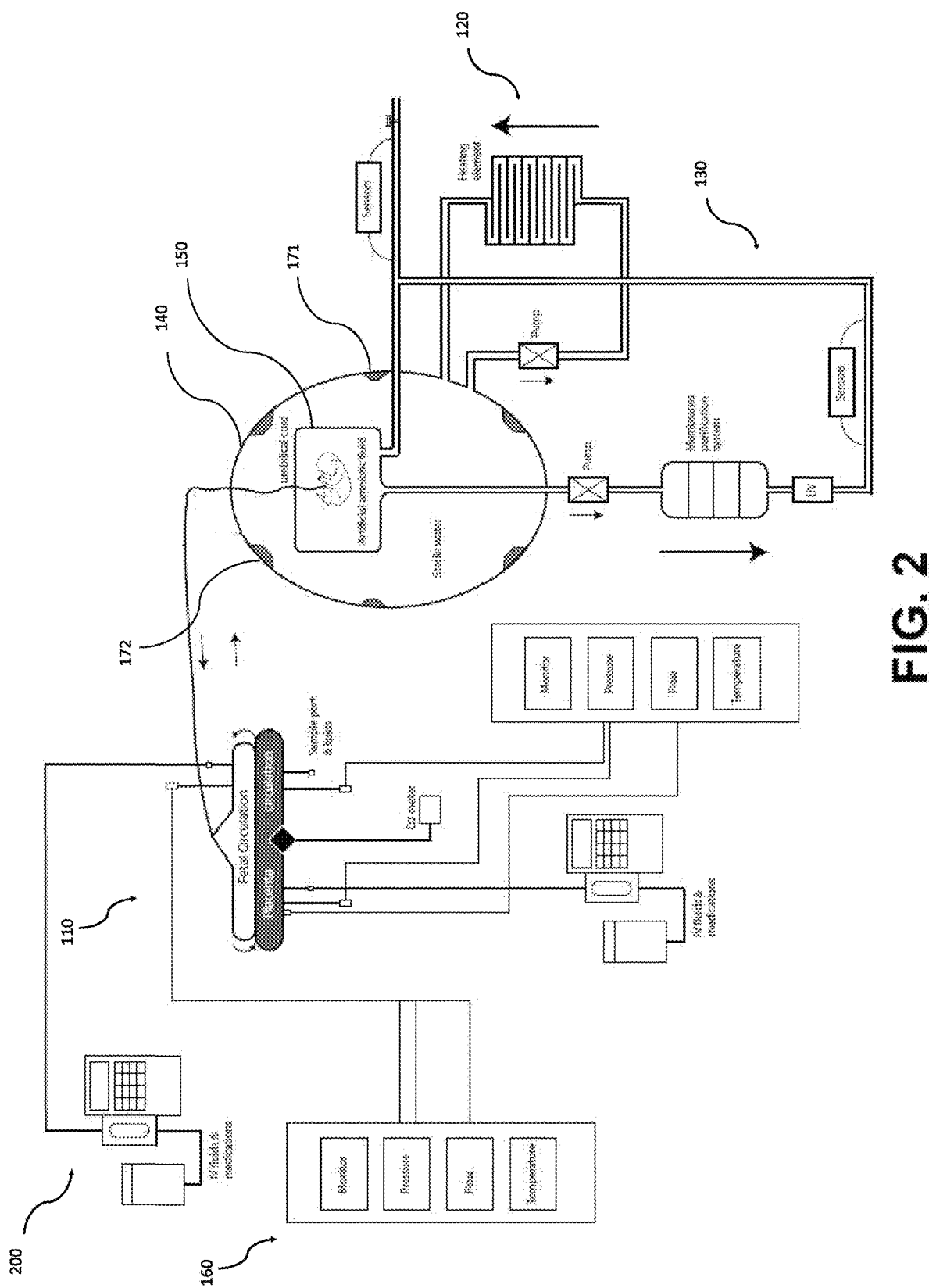
FIG. 2 schematically shows a second embodiment of the system according to the present invention.

FIG. 2 schematically shows a second embodiment of the system according to the present invention.

This embodiment is similar to the first embodiment, but uses a donor placenta. Hence, no ECMO is required. In addition, there the system comprises an additional inlet port assembly for fluids, arranged for connecting with the umbilical cord of said infant. There are components for IV fluids and medications provided, linked to the fetal circulation block, to deliver fluids and medications directly into the fetal circulation. Some medication and fluids should be delivered via the placenta side, other directly into the fetal circulation.

There is also a further block provided on the left-hand of the schematic figure which includes: monitor, pressure, flow and temperature. This block also appears to be connected to the fetal circulation block and the artificial placenta circulation block. Their function is the same as described for the monitor, pressure, flow and temperature of the placental monitor, but now for the fetal circulation.

There is no dialysis unit. This function is taken care of by the placenta, which may be a donor placenta or an artificial placenta.

Figure 3:
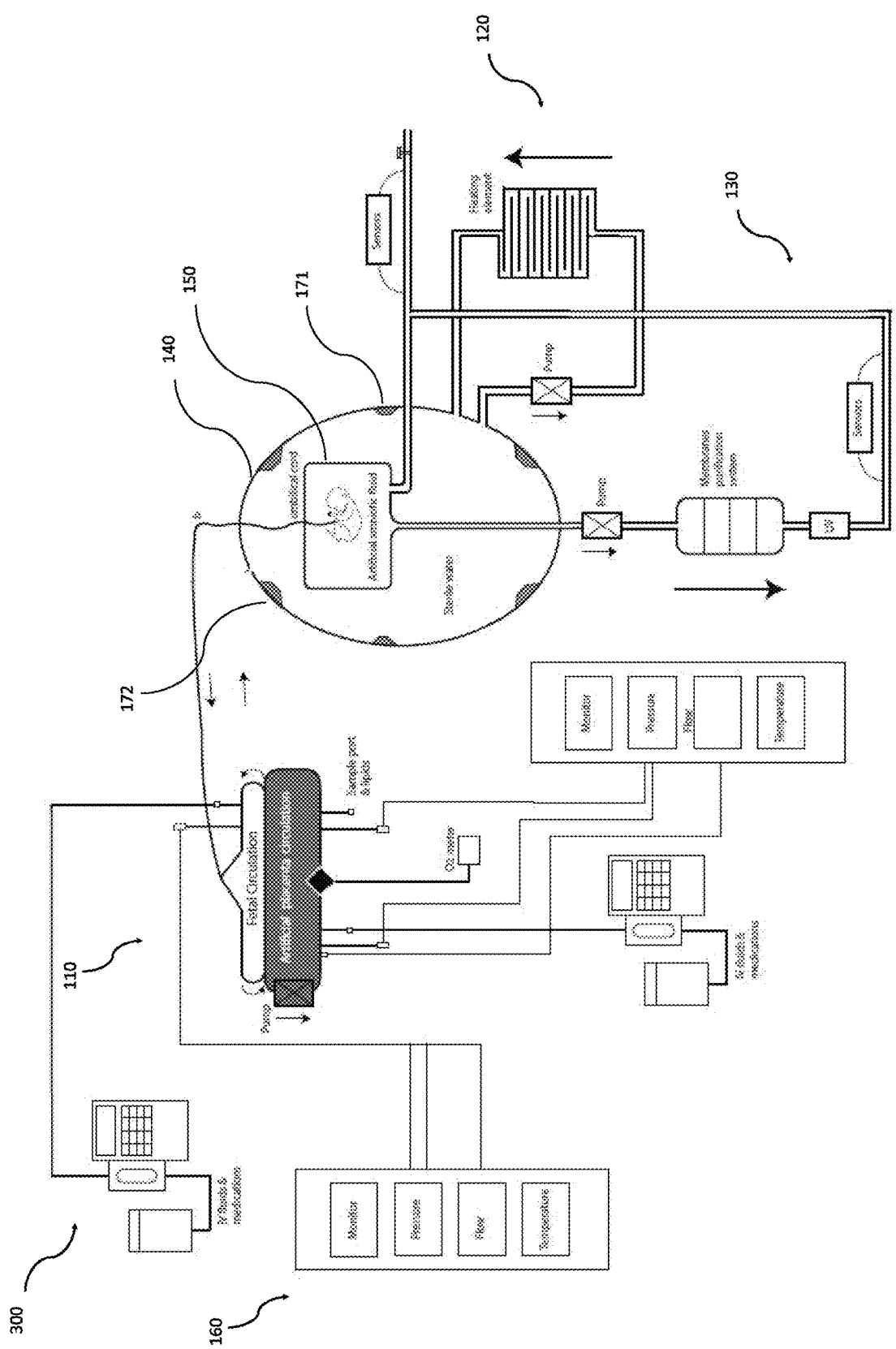
FIG. 3 schematically shows a third embodiment of the system according to the present invention.

FIG. 3 schematically shows a third embodiment of the system according to the present invention.

This embodiment is similar to the second embodiment, but uses an artificial placenta. Therefore, it has a pump in an artificial placenta circulation block, which serves to create a blood flow in the placenta circulation. Normally, the maternal heart would take care of this, but this is not the case in an isolated placenta.

Figure 4:
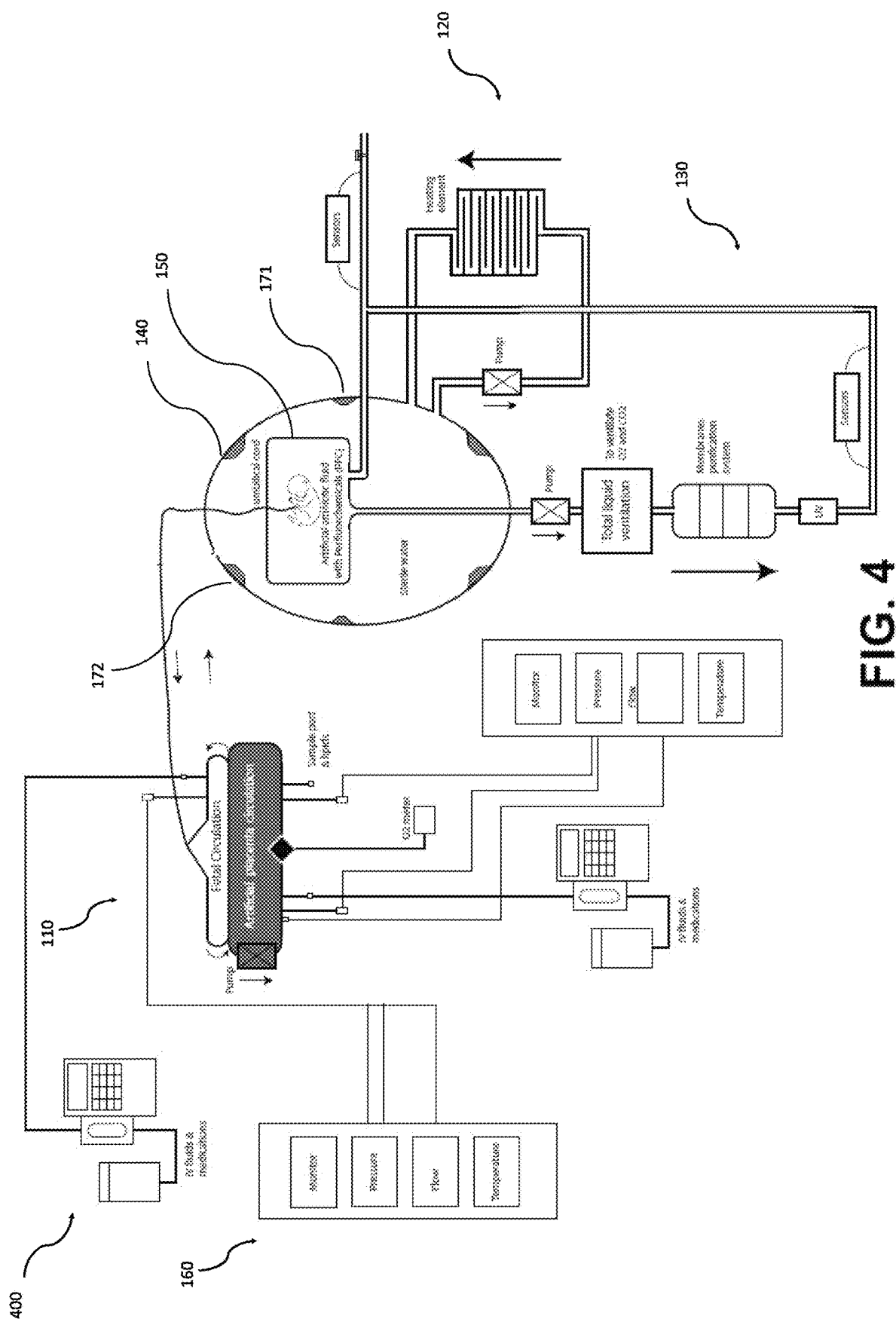
FIG. 4 schematically shows a fourth embodiment of the system according to the present invention.

FIG. 4 schematically shows a fourth embodiment of the system according to the present invention.

This embodiment is similar to the third embodiment. An additional component is provided between the pump connected to the inner chamber and the membranes purification system, for total liquid ventilation. This serves to ventilate $O_2$ and $CO_2$. Via this ventilation the infant also gets $O_2$ via the amniotic fluid and the $CO_2$ can be removed.

A real placenta may be used (ex vivo human placenta perfusion model) for oxygenation, dialyzation and nutritioning. In case of a real placenta, the grey block "artificial placenta circulation" in FIGS. 3 and 4 may have an alternative text "real placenta circulation". The placenta might be a priory prepared donor placenta, to guarantee a smooth and quick transition from intra-uterine to the artificial womb environment, but ideally the placenta would be of the biological mother of the fetus (if healthy). The placenta might be replaced later by an artificial placenta. The placenta will use a separate circulation circuit with preferably maternal blood. This circulation is connected to an adult ECMO (this is similar to "$O_2$ meter" and "gas mixer" with gas bottles as presented in center of FIGS. 1 and 5), to provide for physiologic flow rates and blood values ($CO_2$ and $O_2$), but also to adult dialyzation, to ensure metabolic waste removal of the blood that exits at the maternal side of the placenta (similar to "dialyzer" and "filter" with "dialyzer fluid drain/treated with water" as presented in FIGS. 1 and 5). Nutrition compounds are applied through total parenteral nutrition, inserted to the blood that enters the maternal side of the placenta (This can be seen in all corresponding figures as "IV fluids and medications").

Figure 5:
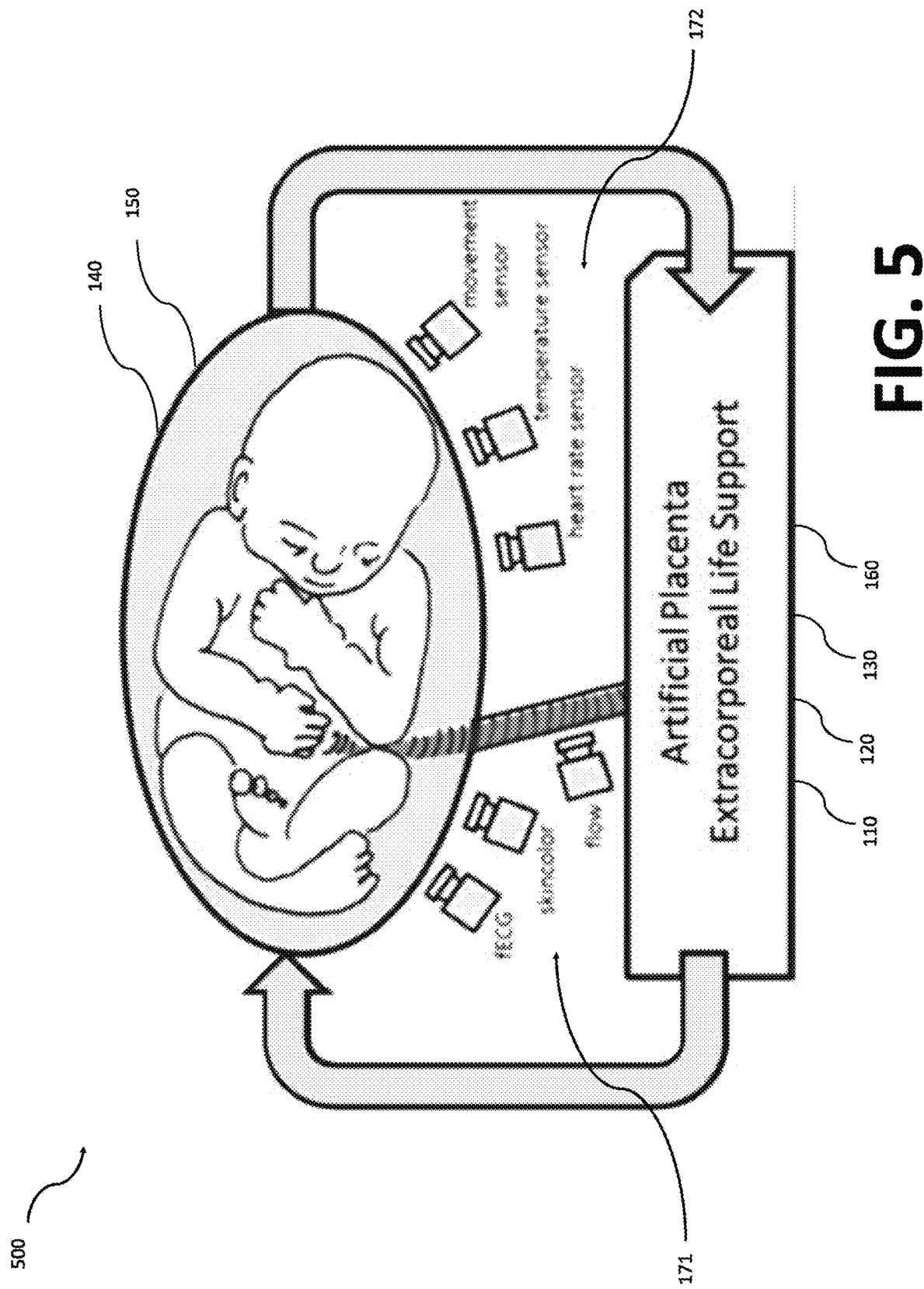
FIG. 5 shows a schematic view of the system for incubation according to the invention.

FIG. 5 shows a schematic view of the system for incubation according to the invention. This illustrates the infant in a safe environment, and shows that the monitoring and cardiorespiratory needs are not interfering with the infant. The infant is supplied with oxygen, nutrients, heat and amniotic fluid; and waste and carbon dioxide are washed out via an extra-corporeal life support and an artificial placenta, without changing the fetal cardiorespiratory circulation.

DESCRIPTION OF EMBODIMENTS

In an embodiment of the system according to the present invention, the amniotic fluid circulation unit further comprises a UV light source the membrane purification system.

In another embodiment, the amniotic fluid circulation unit comprises one or more sensors arranged for purification of said amniotic fluid.

In another embodiment, the amniotic fluid circulation unit further comprises an inlet port to introduce nutrients and water into the amniotic fluid.

In another embodiment, the system further comprises one or more stimulation devices inside or attached to the outer chamber. In a specific embodiment, the one or more stimulation devices comprise one or more of the group of: auditory stimulation devices, visual stimulation devices and tactile stimulation devices.

Examples of auditory stimulation include family sounds such as speech, sungs, household sounds (e.g. playing music, family interactions); and maternal physiological sounds such as bowel sounds and heartrate. The auditory stimulation device can comprise audio speakers.

Examples of visual stimulation include light and darkness for mimicking a diurnal rhythm. The visual stimulation device can comprise controlled lighting.

Examples of tactile stimulation include maternal movements such as walking, sporting, sitting and lying, but also breathing; uterine contractions such as Braxton Hicks contractions during "incubation time" or labor contractions prior to transition from the artificial womb to neonatal life.

In another embodiment, the system further comprises one or more sensors inside or attached to the outer chamber. In a specific embodiment, the one or more sensors comprise microfluidic device and/or a capacitive sensor. In an embodiment, the one or more sensors are chosen from the group of a camera, ultrasound imaging device, electrocardiograph (ECG), electroencephalograph (EEG), tactile sensor device, chemical analysis device for blood and/or amniotic fluid, and combinations thereof.

In another embodiment, the system further comprises an extra corporeal membrane oxygenation unit (ECMO).

In another embodiment, the system further comprises an inlet port assembly for fluids, arranged for connecting with the umbilical cord of said infant.

In an embodiment one or more elements of the system are computer-implemented. The system may comprise a processor, a memory system and/or a controller for operating the system according to the invention. A computer program may be stored/distributed on a suitable medium, such as an optical storage medium or a solid-state medium supplied together with or as part of other hardware, but may also be distributed in other forms, such as via the Internet or other wired or wireless telecommunication systems. A single processor or other unit may fulfil the functions of several items recited in the claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope thereof.

The scope of the present invention is defined by the appended claims. One or more of the objects of the invention are achieved by the appended claims.

The invention claimed is:

1. An incubation system for liquid-based incubation of prematurely born infants, comprising:

an inner chamber forming an amniotic basin containing amniotic fluid, the amniotic basin configured to hold an infant, and the amniotic basin made from a flexible material configured to expand an inner chamber volume in correspondence with growth of the infant;

an outer chamber enclosing the inner chamber, the outer chamber containing a temperature regulation fluid;

a fetal connection port configured to connect with an umbilical cord of the infant, the fetal connection port providing a port in the inner chamber to the infant to provide dialyzation and nutrition compounds to the infant via the umbilical cord;

a fetal control unit coupled to the fetal connection port to control the dialyzation and provided nutrition compounds by monitoring and controlling one or more of a pressure, flow and temperature thereof;

an amniotic fluid circulation unit configured to connect with an inlet/outlet port of the inner chamber, the amniotic fluid circulation unit comprising a pump configured to circulate the amniotic fluid from the inner chamber and through a purification system located outside of the inner chamber; and a temperature regulation fluid control unit configured to connect with an inlet/outlet port of the outer chamber, the temperature regulation fluid control unit comprising a pump configured to circulate the temperature regulation fluid from the outer chamber and through a heat exchanger system located outside of the outer chamber.

2. The incubation system according to claim 1, wherein the amniotic fluid circulation unit comprises a UV light source.

3. The incubation system according to claim 2, wherein the amniotic fluid circulation unit comprises at least one sensor configured to purify the amniotic fluid.

4. The incubation system according to claim 1, wherein the amniotic fluid circulation unit further comprises an inlet port configured to introduce nutrients and water into the amniotic fluid.

5. The incubation system according to claim 1, further comprising at least one stimulation device disposed within or attached to the outer chamber.

6. The incubation system according to claim 5, wherein the at least one stimulation device comprises at least one of an auditory stimulation device, a visual stimulation device, and a tactile stimulation device.

7. The incubation system according to claim 1, further comprising at least one sensor disposed within or attached to the outer chamber.

8. The incubation system according to claim 7, wherein the at least one sensor comprises at least one of a microfluidic device and a capacitive sensor.

9. The incubation system according to claim 7, wherein the at least one sensor is selected from the group including a camera, an ultrasound imaging device, an electrocardiograph (ECG), an electroencephalograph (EEG), a tactile sensor device, a chemical analysis device for blood and/or amniotic fluid, and combinations thereof.

10. The incubation system according to claim 1, further comprising an extra corporeal membrane oxygenation unit (ECMO).

11. The incubation system according to claim 1, further comprising an inlet port assembly for fluids configured to connect with the umbilical cord of the infant.

12. An incubation system, comprising:

an inner chamber configured to hold an infant and expand in volume in correspondence with growth of the infant, the inner chamber containing amniotic fluid;

an outer chamber enclosing the inner chamber, the outer chamber containing temperature regulation fluid;

a fetal connection port received in the inner chamber and configured to connect with an umbilical cord, the fetal connection port configured to deliver dialyzation and nutrition compounds;

a fetal control unit coupled to the fetal connection port, the fetal control unit configured to monitor and control at least one of pressure, flow rate, and temperature of the dialyzation and nutrition compounds;

an amniotic fluid circulation unit coupled to an inlet/outlet port of the inner chamber, the amniotic fluid circulation unit including a pump configured to circulate the amniotic fluid from the inner chamber through a purification system located outside of the inner chamber; and a temperature regulation fluid control unit coupled to an inlet/outlet port of the outer chamber, the temperature regulation fluid control unit including a pump configured to circulate the temperature regulation fluid from the outer chamber through a heat exchanger system located outside of the outer chamber.

13. The incubation system according to claim 12, wherein the amniotic fluid circulation unit includes a UV light source and at least one sensor.

14. The incubation system according to claim 12, wherein the amniotic fluid circulation unit is configured to supply at least one of nutrients and water to the amniotic fluid.

15. The incubation system according to claim 12, further comprising at least one stimulation device disposed within or attached to the outer chamber.

16. The incubation system according to claim 12, further comprising at least one sensor disposed within or attached to the outer chamber.

17. The incubation system according to claim 12, wherein the fetal control unit includes an extra corporeal membrane oxygenation unit (ECMO).

* * * * *